(12) United States Patent
DeSilva et al.

(10) Patent No.: US 9,696,216 B2
(45) Date of Patent: Jul. 4, 2017

(54) ACOUSTIC TRANSDUCER IN SYSTEM FOR GAS TEMPERATURE MEASUREMENT IN GAS TURBINE ENGINE

(71) Applicant: Siemens Energy, Inc., Orlando, FL (US)

(72) Inventors: Upul P. DeSilva, Oviedo, FL (US); Heiko Claussen, North Brunswick, NJ (US)

(73) Assignee: SIEMENS ENERGY, INC., Orlando, FL (US)

( * ) Notice: Subject to any disclaimer, the term of this patent is extended or adjusted under 35 U.S.C. 154(b) by 377 days.

(21) Appl. No.: 14/639,563

(22) Filed: Mar. 5, 2015

(65) Prior Publication Data

US 2015/0185089 A1    Jul. 2, 2015

Related U.S. Application Data

(63) Continuation-in-part of application No. 14/017,386, filed on Sep. 4, 2013, now Pat. No. 9,453,784.

(51) Int. Cl.
| | |
|---|---|
| *G01K 11/24* | (2006.01) |
| *G01K 13/02* | (2006.01) |
| *G01M 15/14* | (2006.01) |
| *F02C 9/00* | (2006.01) |

(Continued)

(52) U.S. Cl.
CPC ............... *G01K 11/24* (2013.01); *F02C 9/00* (2013.01); *G01K 13/02* (2013.01); *F05D 2270/303* (2013.01); *G01H 1/003* (2013.01); *G01H 3/00* (2013.01); *G01K 2013/024* (2013.01); *G01M 15/14* (2013.01)

(58) Field of Classification Search
CPC .. G01K 11/24; G01K 13/02; G01K 2013/024; F02C 9/00; G01M 15/14; G01H 1/003; G01H 3/00; F05D 2270/303
See application file for complete search history.

(56) References Cited

U.S. PATENT DOCUMENTS

| | | |
|---|---|---|
| 3,427,881 A | 2/1969 | Steinberg |
| 3,451,269 A | 6/1969 | Johnson |

(Continued)

OTHER PUBLICATIONS

Roberto Roubicek; Gas Temperature Measurement in the Fireside of Process Heaters-Using Acoustic Pyrometry; 2003 NPRA Maintenance Conference; 2003; Salt Lake City, Utah.

(Continued)

*Primary Examiner* — Randy Gibson

(57) ABSTRACT

An apparatus for controlling operation of a gas turbine engine including at least one acoustic transmitter/receiver device located on a flow path boundary structure. The acoustic transmitter/receiver device includes an elongated sound passage defined by a surface of revolution having opposing first and second ends and a central axis extending between the first and second ends, an acoustic sound source located at the first end, and an acoustic receiver located within the sound passage between the first and second ends. The boundary structure includes an opening extending from outside the boundary structure to the flow path, and the second end of the surface of revolution is affixed to the boundary structure at the opening for passage of acoustic signals between the sound passage and the flow path.

19 Claims, 10 Drawing Sheets

(51) Int. Cl.
*G01H 3/00* (2006.01)
*G01H 1/00* (2006.01)

(56) References Cited

U.S. PATENT DOCUMENTS

| | | | |
|---|---|---|---|
| 3,597,974 A * | 8/1971 | Black | G01K 13/02 |
| | | | 374/118 |
| 3,769,839 A | 11/1973 | Innes | |
| 3,885,436 A | 5/1975 | Meyer | |
| 4,020,693 A | 5/1977 | Ahlgren et al. | |
| 4,848,924 A | 7/1989 | Nuspl et al. | |
| 5,275,553 A | 1/1994 | Frish et al. | |
| 5,349,859 A | 9/1994 | Kleppe | |
| 5,369,998 A * | 12/1994 | Sowerby | G01F 1/66 |
| | | | 73/861.04 |
| 5,392,645 A | 2/1995 | Kleppe | |
| 5,404,833 A | 4/1995 | Kleppe | |
| 5,624,188 A | 4/1997 | West | |
| 5,918,281 A * | 6/1999 | Nabulsi | G01F 1/10 |
| | | | 73/597 |
| 6,142,665 A | 11/2000 | Haffner et al. | |
| 6,386,755 B1 | 5/2002 | Draxton et al. | |
| 6,564,164 B1 | 5/2003 | Ih et al. | |
| 6,726,358 B2 | 4/2004 | Draxton et al. | |
| 6,745,632 B1 * | 6/2004 | Dryer | G01N 29/024 |
| | | | 73/597 |
| 6,768,938 B2 | 7/2004 | McBrien et al. | |
| 6,834,992 B2 | 12/2004 | Draxton et al. | |
| 7,013,210 B2 | 3/2006 | McBrien et al. | |
| 7,159,472 B1 * | 1/2007 | Hastings | G01F 1/662 |
| | | | 374/E11.01 |
| 7,383,165 B2 | 6/2008 | Aragones | |
| 7,434,988 B1 | 10/2008 | Kychakoff et al. | |
| 7,761,216 B2 | 7/2010 | Norris et al. | |
| 7,975,552 B2 * | 7/2011 | Kurtz | G01L 19/0609 |
| | | | 73/706 |
| 8,565,999 B2 | 10/2013 | Bunce et al. | |
| 8,616,064 B2 * | 12/2013 | Hurst | G01L 19/0609 |
| | | | 73/702 |
| 9,080,927 B2 * | 7/2015 | Hurst | G01L 19/0609 |
| 9,453,784 B2 * | 9/2016 | DeSilva | G01K 11/24 |
| 2007/0027607 A1 | 2/2007 | Norris et al. | |
| 2007/0151363 A1 * | 7/2007 | Ramsesh | G01F 1/667 |
| | | | 73/861.27 |
| 2008/0107150 A1 * | 5/2008 | Brummel | G01K 11/24 |
| | | | 374/119 |
| 2010/0076698 A1 | 3/2010 | He et al. | |
| 2010/0288055 A1 * | 11/2010 | Mueller | G01F 1/66 |
| | | | 73/861.28 |
| 2012/0150413 A1 | 6/2012 | Bunce et al. | |
| 2012/0204620 A1 * | 8/2012 | Straub, Jr. | G01F 1/66 |
| | | | 73/1.35 |
| 2012/0210694 A1 * | 8/2012 | Holmquist | F01D 17/04 |
| | | | 60/39.091 |
| 2014/0047911 A1 * | 2/2014 | Repetto | G01L 23/00 |
| | | | 73/112.05 |
| 2014/0052410 A1 * | 2/2014 | Tralshawala | F01D 17/04 |
| | | | 702/183 |
| 2014/0130606 A1 * | 5/2014 | Schwarz | G01F 1/663 |
| | | | 73/861.25 |
| 2015/0128723 A1 * | 5/2015 | Satou | G01F 1/662 |
| | | | 73/861.28 |

OTHER PUBLICATIONS

J.A. Kleppe et al.; The Application of Acoustic Pyrometry to Gas Turbines and Jet Engines; AIAA 98-3611; 1998.
Gustave C. Fralick et al.; Passive Acoustic Tomography Tested for Measuring Gas Temperatures; Research and Technology 2003; May 2004; NASA Glenn Research Center, Cleveland, OH.
Gustave C. Fralick; Acoustic Pyrometry Applied to Gas Turbines and Jet Engines; www.grc.nas.gov/WWW/RT/RT1998/5000/5510; 1998.
Dr. Peter Ariessohn; Development of an Acoustic Sensor for On-Line Gas Temperature Measurement in Gasifiers; Technical Progress Report; Enertechnix, Inc.; Quarterly Report Oct. 1, 2005 to Dec. 31, 2005; Issued Jan. 15, 2006; 12 pages.
Brian Moss et al.; Temperature Measurement of Gases using Acoustic Means; 2009 6th International Multi-Conference on Systems, Signals and Devices; 2009; 6 pages.
Raviraj Adve; University of Toronto; "Smart Antennas" course notes; 2007; 25 pages.
Dr. Peter Ariessohn; Development of an Acoustic Sensor for On-Line Gas Temperature Measurement in Gasifiers; Final Report; Enertechnix, Inc.; Final Report Jun. 11, 2003-Jun. 30, 2008; Issued Jul. 31, 2008; 57 pages.
Mauro Bramanti et al.; An Acoustic Pyrometer System for Tomographic Thermal Imaging in Power Plant Boilers; IEEE Transactions on Instrumentation and Measurement; vol. 45, No. 1; Feb. 1996; 9 pages.
G.Q. Shen et al.; Real-Time Monitoring on Boiler Combustion Based on Acoustic Measurement; IEEE Power India Conference; 2006; 4 pages.
R.H. Stones et al.; The Application of Acoustic Pyrometry to Gas Temperature Measurement and Mapping; IEEE Colloquium on Ultrasound in the Process Industry; Sep. 23, 1993; 2 pages.
John A. Kleppe et al.; The Application of Digital Signal Processing to Acoustic Pyrometry; Proc. 1996 IEEE Digital Signal Processing Workshop; 1996; pp. 420-422.
John A. Kleppe et al.; The Application of Image Processing to Acoustic Pyrometry; 1996; pp. 657-659.
K. Srinivasan et al.; Effects of acoustic source and filtering on time-of-flight measurements; Applied Acoustics 70; 2009; pp. 1061-1072.
William J. Norris et al.; The Measurement of Performance of Combustors Using Passive Acoustic Methods: Additional Results; 43rd AIAA Aerospace Sciences Meeting and Exhibit; Jan. 10-13, 2005; American Institute of Aeronautics and Astronautics; 9 pages.
TMS 2000—Theory of Operation; SEI, Inc.; Mar. 1, 2002; 2 pages.
Upul DeSilva et al.; Novel Gas Turbine Exhaust Temperature Measurement System; Proceedings of the ASME Turbo Expo 2013; GT2013-95153; Jun. 3-7, 2013; 8 pages.

* cited by examiner

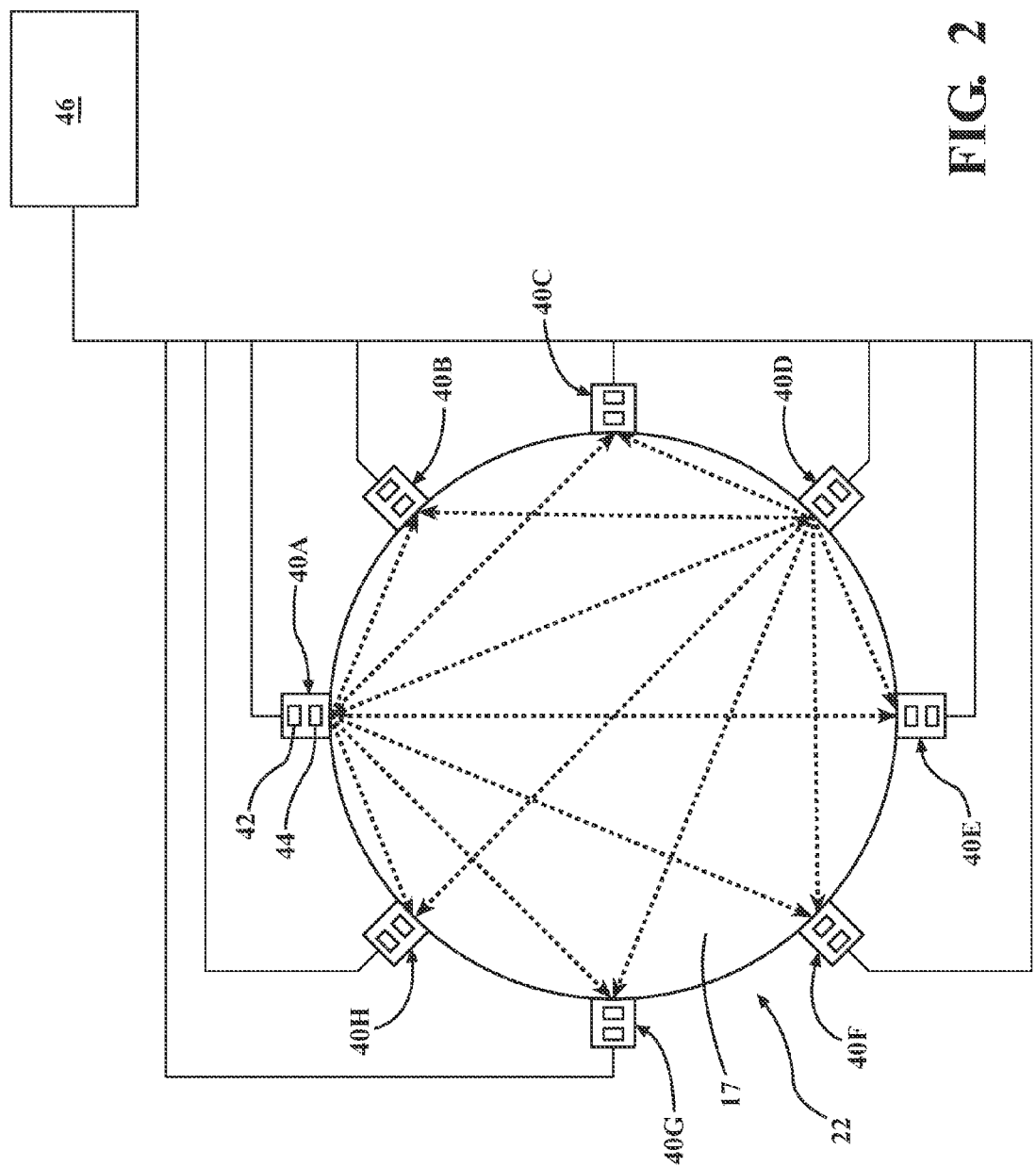

ACOUSTIC TRANSDUCER IN SYSTEM FOR GAS TEMPERATURE MEASUREMENT IN GAS TURBINE ENGINE

CROSS REFERENCE TO RELATED APPLICATIONS

This application is a continuation-in-part of U.S. patent application Ser. No. 14/017,386, filed on Sep. 4, 2013, and entitled "NON-INTRUSIVE MEASUREMENT OF HOT GAS TEMPERATURE IN A GAS TURBINE ENGINE," the entire disclosure of which is incorporated by reference herein.

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The present invention relates to temperature measurement in turbine engines and, more particularly, to determination of temperature of a hot gas using acoustic measurements in a gas turbine engine.

BACKGROUND OF THE INVENTION

Combustion turbines, such as gas turbine engines, generally comprise a compressor section, a combustor section, a turbine section and an exhaust section. In operation, the compressor section can induct and compress ambient air. The combustor section generally may include a plurality of combustors for receiving the compressed air and mixing it with fuel to form a fuel/air mixture. The fuel/air mixture is combusted by each of the combustors to form a hot working gas that may be routed to the turbine section where it is expanded through alternating rows of stationary airfoils and rotating airfoils and used to generate power that can drive a rotor. The expanding gas exiting the turbine section can be exhausted from the engine via the exhaust section.

The fuel/air mixture at the individual combustors is controlled during operation of the engine to maintain one or more operating characteristics within a predetermined range, such as, for example, to maintain a desired efficiency and/or power output, control pollutant levels, prevent pressure oscillations and prevent flameouts. In a known type of control arrangement, a bulk turbine exhaust temperature may also be monitored as a parameter indicative of a condition in the combustor section. For example, a controller may monitor a measured turbine exhaust temperature relative to a reference temperature value, and a measured change in temperature may result in the controller changing the fuel/air ratio at the combustor section.

In a known temperature monitoring system for controlling combustion operations, temperature monitors, such as thermocouples, are located directly in the exhaust flow of the turbine. Such monitoring systems generally require locating thermocouples at different fixed axial locations along the exhaust flow, which may introduce uncertainties in relation to temperature calculations for controlling the engine as conditions affecting operation of the engine change, such as a varying load condition on the engine. Providing temperature measurements of the hot working gas upstream of the turbine section has proven problematic due to difficulties in providing a sensor system capable of providing accurate temperature measurements on a long term basis in this region of the engine.

SUMMARY OF THE INVENTION

In accordance with an aspect of the invention, a gas turbine engine is provided including an apparatus for controlling operation of the gas turbine engine, and the engine having a boundary structure defining a flow path passing through the engine. The apparatus for controlling operation of the engine comprises at least one acoustic transmitter/receiver device located on the boundary structure at a predetermined axial location along the flow path. The acoustic transmitter/receiver device includes an elongated sound passage defined by a surface of revolution having opposing first and second ends and a central axis extending between the first and second ends, an acoustic sound source located at the first end, and an acoustic receiver located within the sound passage between the first and second ends. The boundary structure includes an opening extending from outside the boundary structure to the flow path, and the second end of the surface of revolution is affixed to the boundary structure at the opening for passage of acoustic signals between the sound passage and the flow path.

The acoustic receiver can include a support rod extending through a hole in the surface of revolution between the first and second ends, the support rod having an inner end located within the sound passage and supporting a receiver end for receiving acoustic signals into the acoustic receiver.

The acoustic receiver can include a microphone located on the inner end of the support rod and defining the receiver end.

The support rod can be detachably affixed to the surface of revolution, and can be supported for movement of the inner end toward and away from the central axis of the surface of revolution.

The support rod can include a central portion defining a rod axis extending through the hole in the surface of revolution and transverse to the central axis, and the support rod can include a transition portion that is bent to position a sound receiving opening of the microphone facing away from the acoustic source and toward the flow path.

The microphone can be located at the central axis of the surface of revolution.

A preamplifier can be provided receiving acoustic signals from the microphone and located at an outer end of the support rod outside of the sound passage.

The receiver end at the inner end of the support rod can be formed as a horn defined by an outwardly tapered wall, extending from the inner end of the support rod, for receiving acoustic signals into the acoustic receiver.

The support rod can include a hollow central portion defining a waveguide extending through the hole in the surface of revolution, and the acoustic receiver can include a microphone at an outer end of the support rod outside of the sound passage.

The surface of revolution can be tapered outwardly from the acoustic source to the boundary structure and can define a horn surrounding the horn of the receiver end.

The horn of the receiver end includes an open end located at the opening of the boundary structure, and an annular acoustic transmission passage is defined between the surface of revolution and the horn of the receiver at the boundary structure.

The first end of the surface of revolution can define a parabolic dish surface facing toward the horn of the receiver end, and the horn of the receiver end can include an open end facing toward the parabolic dish surface.

The acoustic sound source can be spaced from the parabolic dish surface by an elongated waveguide having a proximal outlet opening adjacent to the parabolic dish surface and a distal inlet opening adjacent to the acoustic sound source.

The central axis of the acoustic transmitter/receiver device can be oriented at an angle between 90 degrees and 180 degrees relative to an axial flow direction of gases in the flow path to project acoustic signals in a downstream direction from the opening in the boundary structure.

The at least one acoustic transmitter/receiver device can define a first acoustic transmitter/receiver device, and a second acoustic transmitter/receiver device can be located on the boundary structure at a predetermined axial position in a downstream direction from the first acoustic transmitter/receiver device relative to a gas flow direction in the flow path, the second transmitter/receiver device receiving acoustic sound signals transmitted from the first acoustic transmitter/receiver device.

In accordance with another aspect of the invention, a gas turbine engine is provided including an apparatus for controlling operation of the gas turbine engine, and the engine having a boundary structure defining a flow path passing through the engine. The apparatus for controlling operation of the engine comprises first and second acoustic transmitter/receiver devices located on the boundary structure at predetermined axial locations along the flow path. The acoustic transmitter/receiver devices each include an elongated sound passage defined by a surface of revolution having opposing first and second ends and a central axis extending between the first and second ends, an acoustic sound source located at the first end, and an acoustic receiver located within the sound passage between the first and second ends. The acoustic receiver includes a support rod extending through a hole in the surface of revolution between the first and second ends, the support rod having an inner end located within the sound passage and supporting a receiver end for receiving acoustic signals into the acoustic receiver. The boundary structure includes first and second openings extending from outside the boundary structure to the flow path, and the second end of each surface of revolution is affixed to the boundary structure at a respective one of the openings for passage of acoustic signals between the sound passage and the flow path.

The central axes of the surface of revolution for the first and second acoustic transmitter/receiver devices can be located on a common line passing through the flow path and oriented at a non-perpendicular direction relative to the flow path direction.

In accordance with a further aspect of the invention, a gas turbine engine is provided including an apparatus for controlling operation of the gas turbine engine, and the engine having a boundary structure defining a flow path passing through the engine. The apparatus for controlling operation of the engine comprises first and second acoustic transmitter/receiver devices located on the boundary structure at predetermined axial locations along the flow path. The acoustic transmitter/receiver devices each include an elongated sound passage defined by a surface of revolution having opposing first and second ends and a central axis extending between the first and second ends, an acoustic sound source located at the first end, and an acoustic receiver located within the sound passage between the first and second ends. The boundary structure includes first and second openings extending from outside the boundary structure to the flow path, and the second end of each surface of revolution is affixed to the boundary structure at a respective one of the openings for passage of acoustic signals between the sound passage and the flow path. A signal generator is provided producing at least one signal having a distinct signature defined by a set of predetermined frequencies forming a non-broadband signal that is output as an acoustic sound signal at the acoustic sound source. A signal processor is configured to compare signals received at the second acoustic transmitter/receiver device to one or more transmitted signals to identify a similarity of a received signal to a transmitted signal to identify a transmission time for the received signal, and the processor is configured to determine a time-of-flight for the received signal and to process the time-of-flight to determine a temperature in a region of the predetermined axial location.

The acoustic receiver of the first acoustic transmitter/receiver device can include a microphone connected to the signal processor and providing a signal corresponding to initiation of the transmitted signal as the transmitted signal passes the acoustic receiver of the first acoustic transmitter/receiver device.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 2 is a diagrammatic view of the system for determining temperature;

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

A temperature measurement apparatus or system is described herein that is configured to be used to continuously monitor high temperature combustion gases, such as may be on the order of 1500° F., as part of an on-line monitoring and control system to be used on a long term basis within a gas turbine engine. In accordance with an aspect of the invention, it has been noted that acoustic pyrometry methods may be implemented to avoid placing temperature probes directly within the hot combustion gas flow, however, background noise associated with combustion, or other engine generated noises, can hinder accurate detection of sound signals that are transmitted into and received from the combustion gas path. The temperature measurement method and apparatus described herein is directed to production of one or more unique sound signals that are distinct and recognizable from sounds or noises produced by the engine, enabling accurate association of a received acoustic signal with a transmitted signal to enable identification of the received signal as having been transmitted by the system and to provide an associated time of transmission for the received signal. Having identifiable signals, with associated transmission and reception times, provides data for time-of-flight calculations of the signals through the hot gas path which can be used to estimate the temperature of locations within the gas path.

Figure 1:
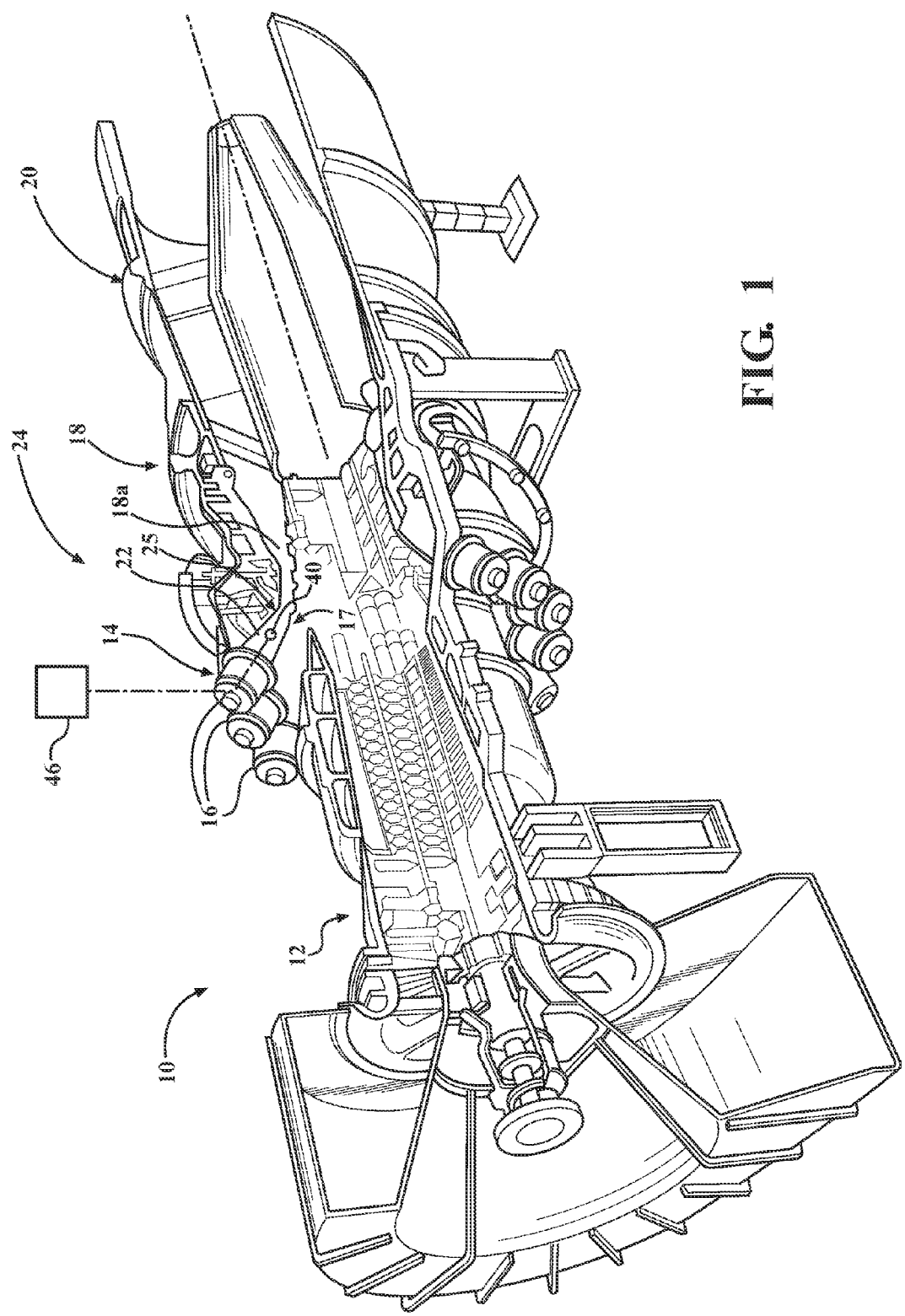
FIG. 1 is a perspective cross-sectional view of a gas turbine engine illustrating implementation an acoustic temperature measurement system in accordance with aspects of the present invention.

Referring to FIG. 1, embodiments of the invention are directed to an acoustic temperature measurement system 24 that may be incorporated in a gas turbine engine 10 and to methods of using the acoustic temperature measurement system 24 to determine temperatures at predetermined locations in the engine 10 and to control an operation of the engine 10. Aspects of the invention will be explained in connection with possible configurations of the system 24, but the detailed description is intended only as exemplary.

Referring to the drawings, and in particular to FIG. 1, a portion of an exemplary gas turbine engine 10 is shown. The exemplary engine 10 includes a compressor section 12, a combustor section 14, a turbine section 18, and an exhaust section 20. The combustor section 14 includes a plurality of combustor baskets or combustors 16 and associated transition ducts 22, wherein the combustors 16 and transition ducts 22 may be cylindrical passages forming a boundary structure 25 defining a flow path or passage 17 for conveying a hot working gas to the turbine section 18.

During operation of the engine 10, compressed air from the compressor section 12 is provided to the combustor section 14 where it is combined with fuel in the combustors 16, and the fuel/air mixture is ignited to form combustion products comprising the hot working gas. It may be understood that combustion of the fuel and air may occur at various axial locations along the passage to the inlet 18a of the turbine section 18. The hot working gas is expanded through the turbine section 18 and is exhausted through the exhaust section 20.

The acoustic temperature measurement system 24, is described herein with reference to locating acoustic devices (transmitters/receivers) for the system 24 at or adjacent to the inlet 18a for the turbine section 18 for determining a turbine inlet temperature, however, it may be understood that the system 24, and methods of operation for the system 24 may be implemented at other locations along the engine 12, such as at the exhaust section 20. In the described embodiment, the acoustic devices for the system 24 are positioned on the transition ducts 22 and a plurality of the acoustic devices may be located in a measurement plane of each transition duct 22 extending generally perpendicular to a longitudinal axis of the respective transition duct 22, i.e., perpendicular to a flow path 17 of the hot working gas within the duct 22. The location of the measurement plane defines a predetermined axial location at which temperature measurements are obtained along the flow path of the gas turbine engine 12. Alternatively, the acoustic devices may be positioned such that one or more acoustic devices are downstream from one or more acoustic devices located at an upstream location, as is described in greater detail below.

A diagrammatic view of the acoustic temperature measurement system 24 is illustrated in FIG. 2, taken at a cross-section of one of the transition ducts 22. The system 24 comprises a plurality of acoustic transmitter/receiver devices or audio transducer units 40 (only one transducer unit 40 shown in FIG. 1) supported around the circumference of the transition duct 22. The transducer units 40 are illustrated in FIG. 2 diagrammatically by the eight transducer units labeled 40A-40H, and may each include a housing supporting a speaker (transmitter) 42 and a separate microphone (receiver) 44, illustrated schematically on transducer unit 40A. Configurations of the audio transducer units 40 are described below with reference to FIGS. 7-10. It should be understood that, within the spirit and scope of the present invention, a greater number or fewer transducer units 40 may be provided to perform a temperature sensing operation. For example, it may be desirable to provide a greater number of transducer units 40 to provide greater accuracy in mapping of temperatures within the flow path 17, as is described in greater detail below.

Each of the transducer units 40 includes an inner end that is positioned at an opening in the transition duct 22, where the transducer unit 40 is mounted to an outer surface of the transition duct 22, to emit acoustic signals and to receive acoustic signals. The transducer units 40 are connected to a processor or controller 46 that is configured to control the transducer units 40 to produce predetermined output signals and to receive time-of-flight signals corresponding to the output signals. The controller 46 is further configured to store and process data corresponding to the received signals to calculate temperatures and to produce outputs in accordance with the calculated temperatures associated with the received signals, as is described in greater detail below. The controller 46 is additionally configured to provide control signals for controlling operations affecting combustion, including signals to the individual combustors 16, providing control of, for example, the fuel/air ratio at the combustors 16.

During a data acquisition operation, at least one of the transducer units 40 may comprise a transmitting unit 40 producing a signal that traverses the hot gas flow path 17 in the plane defined by the plurality of transducer units 40, and at least one of the transducer units 40 may comprise a receiving unit 40, which is a different transducer unit 40 than the transmitting transducer unit 40. The time-of-flight of a signal traveling between the transmitting and the receiving units 40 may be used to determine an average temperature of the gas through which the signal has traveled. Specifically, the present invention uses the principle that the speed of sound in a gas changes as a function of temperature. For a determined or known composition of the gas, it is possible to determine the temperature of the gas based on the measured time for an acoustic or sound signal to travel the distance between the transmitting and receiving transducers 40, i.e., based on the speed of the sound signal traveling through the gas. The temperature, T (° C.), of the gas may be calculated using the equation:

$$T = \left(\frac{d}{B*t}\right)^2 - 273.16$$

where:

$$B = \text{acoustic constant} = \sqrt{\frac{y*R}{M}}, \text{(m/s)}$$

Y=ratio of specific heats of the gas
R=universal gas constant, 8.314 J/mole–° K
M=molecular weight of the gas (Kg/mole)
d=distance traveled by sound signal (m)
t=time-of-flight of the sound signal (s)

Referring to FIG. 2, line-of-sound paths extending from two of the transducer units 40A and 40D to each of the other transducer units 40 are shown to illustrate exemplary intersecting line-of-sound-paths in accordance with an operation of the present invention, it being understood that the line-of-sound paths from each of the other transducer units 40 are formed in a similar manner, but are not illustrated in FIG. 2. A transmitted signal from each of the transducer units 40 may travel to and be received at each of the other transducer units 40.

It should be understood that, in addition to any signals transmitted from the transducer units 40, there is a substantial amount of noise present within the transition duct 22, such as may be produced by combustion events within and downstream from the combustor 16. This noise is present at various frequencies, including frequencies that may overlap frequencies of the acoustic signals produced by the transducer units 40, and may make it difficult to verify that received acoustic signals are valid signals to be included in the processing of the data received for performing a temperature determination. In accordance with an aspect of the invention, signals generated by the system 24 are formed as designed signals that can be clearly distinguished from the noise that is generated by the engine. The designed signals are formed with a predetermined signal pattern that is sparse in the time-frequency domain is therefore likely to be uncorrelated to the noise generated by the engine, which facilitates the ability to recognize and separate the signal from the engine generated noise. Also, the sparse signal pattern is designed to have a very narrow autocorrelation, which helps in determining an accurate time-of-flight in the presence of noise.

Figure 3A:
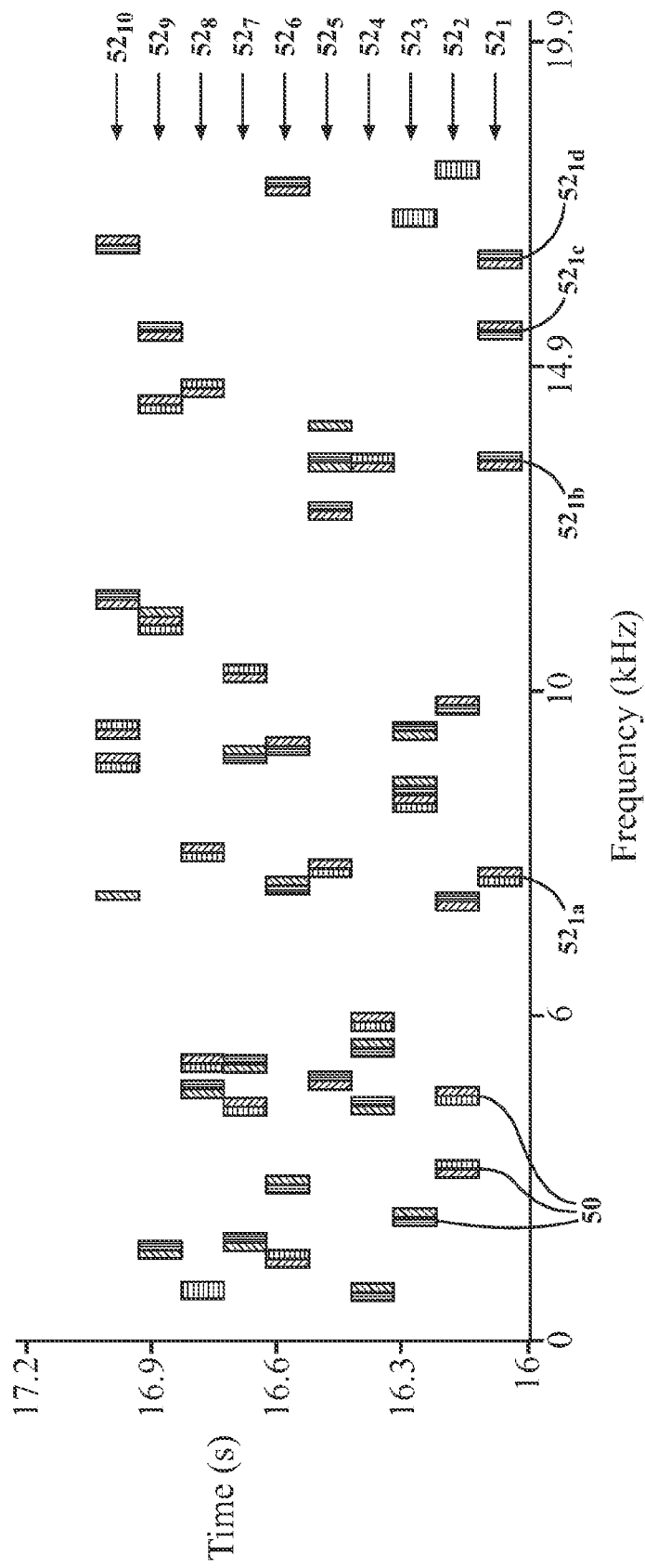
FIG. 3A is a chart illustrating an encoded signal produced by signal generator for transmission from a transducer in accordance with an aspect of the invention.
Figure 3B:
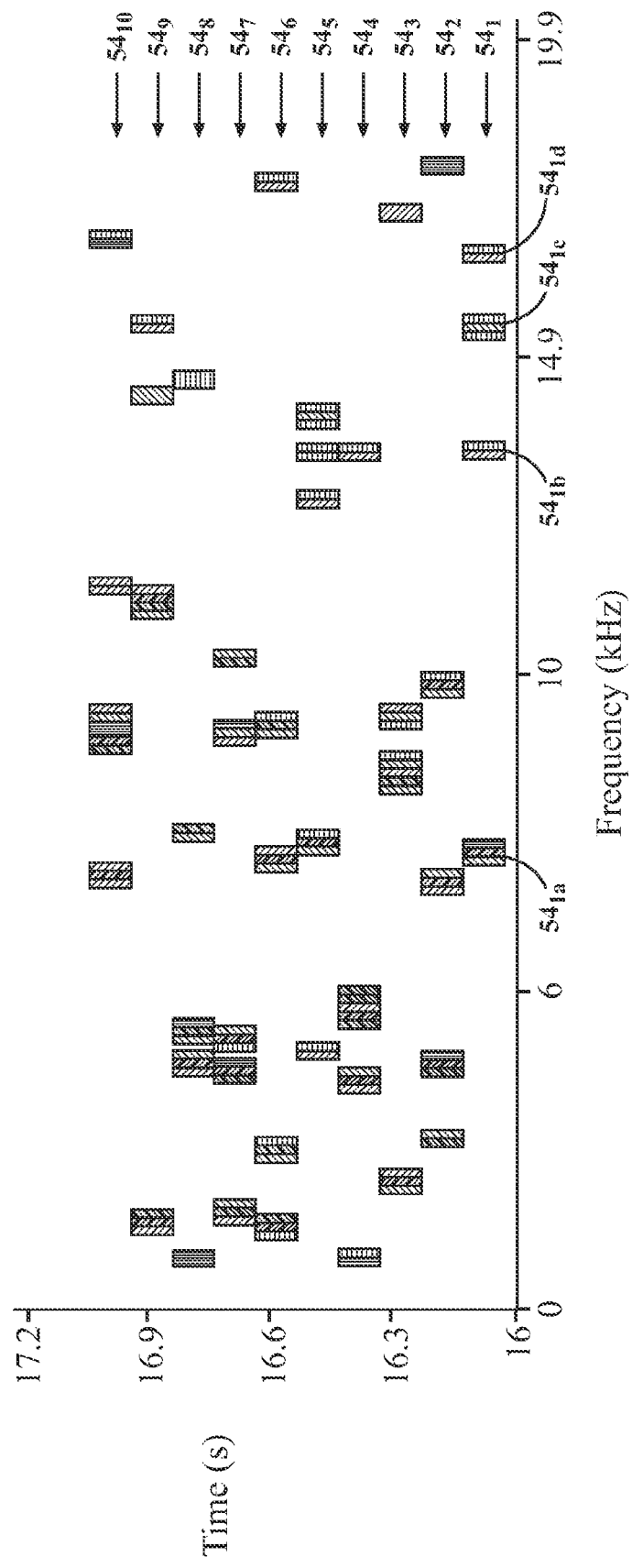
FIG. 3B is a chart illustrating an encoded signal received by a transducer and corresponding to the transmitted signal of FIG. 3A.

An example of a designed signal provided for transmission from a transducer unit 40 is illustrated in FIG. 3A, and an example of a corresponding signal received at another transducer unit 40 is illustrated in FIG. 3B. As can be seen in FIGS. 3A and 3B, the designed signals are depicted as distinct frequency marks, generally designated 50, that are spaced in both frequency, i.e., non-broadband, and time. That is, a group of distinct frequencies, e.g., four or five frequencies, are transmitted as a signal sub-group at a particular time, and the signal sub-groups are transmitted sequentially in time to form the encoded signal.

As illustrated in FIG. 3A, each signal sub-group is designated as $52_n$, where n=1, 2, 3 . . . , and the frequency marks 50 for each signal group, depicting distinct frequencies, are designated as $52_{nm}$, where m=a, b, c, . . . , as is particularly illustrated for a first signal sub-group $52_1$. The corresponding received signal depicted in FIG. 3B has similarly labeled signal sub-groups that are designated as sub-groups $54_n$, including distinct frequencies $54_{nm}$, as is particularly illustrated for a first received signal sub-group $54_1$. As can be seen in FIG. 3A, each successive signal sub-group $52_n$ includes different distinct frequencies $52_{nm}$ from the other signal sub-groups $52_n$ forming the transmitted signal.

Hence, in addition to the signal sub-groups $52_n$ each forming a distinct identifiable pattern, or individual signature, along the frequency axis, i.e., sparsely correlated in the frequency domain, the series of successive signal sub-groups $52_n$ also form a distinct identifiable pattern, or overall signature, of frequencies along the time axis, i.e., sparsely correlated in the time domain. That is, while a signature of the signal could be formed by only one signal sub-group $52_n$ defined by distinct frequencies, forming a signature of a plurality of the subgroups $52_n$ increases the distinctness of the signature and forms a signal with a sparse autocorrelation characteristic.

Further, it should be understood that in accordance with aspects of the invention, the background noise received at the transducer units 40 may be monitored by the system 24. Based on the detected background noise, the system 24 may change the signature of the transmitted signals in order to reduce the level of correlation relative to the frequencies generated by the engine and present as noise that is received at the transducer units 40.

The received signal sub-groups $54_n$ arrive at the receiving transducer 40 at some time after transmission from the transmitting transducer 40, where the delay corresponds to the time-of-flight to travel through the hot working gas, and may be used to determine the gas temperature as described above. Further, the distinct frequencies $52_{nm}$ forming each signal sub-group $52_n$ are transmitted for a time duration that is longer than the time for the signal sub-group to travel between the transmitting and receiving transducers 40 in order to provide a substantial received signal having a duration sufficiently long to be processed and identified by frequency and amplitude. It may be understood that a time-of-flight may be calculated for each signal sub-group based on the time that the transmission of the transmitted signal sub-group $52_n$ is initiated and the time that the received signal sub-group $54_n$ is initially received, i.e., based on the leading edges of the signal sub-groups $52_n$, $54_n$. Hence, the correlation of the received signal to the encoded transmitted signal provides a verifiable time of transmission for use with the detected reception time to determine an accurate time-of-flight.

Figure 4:
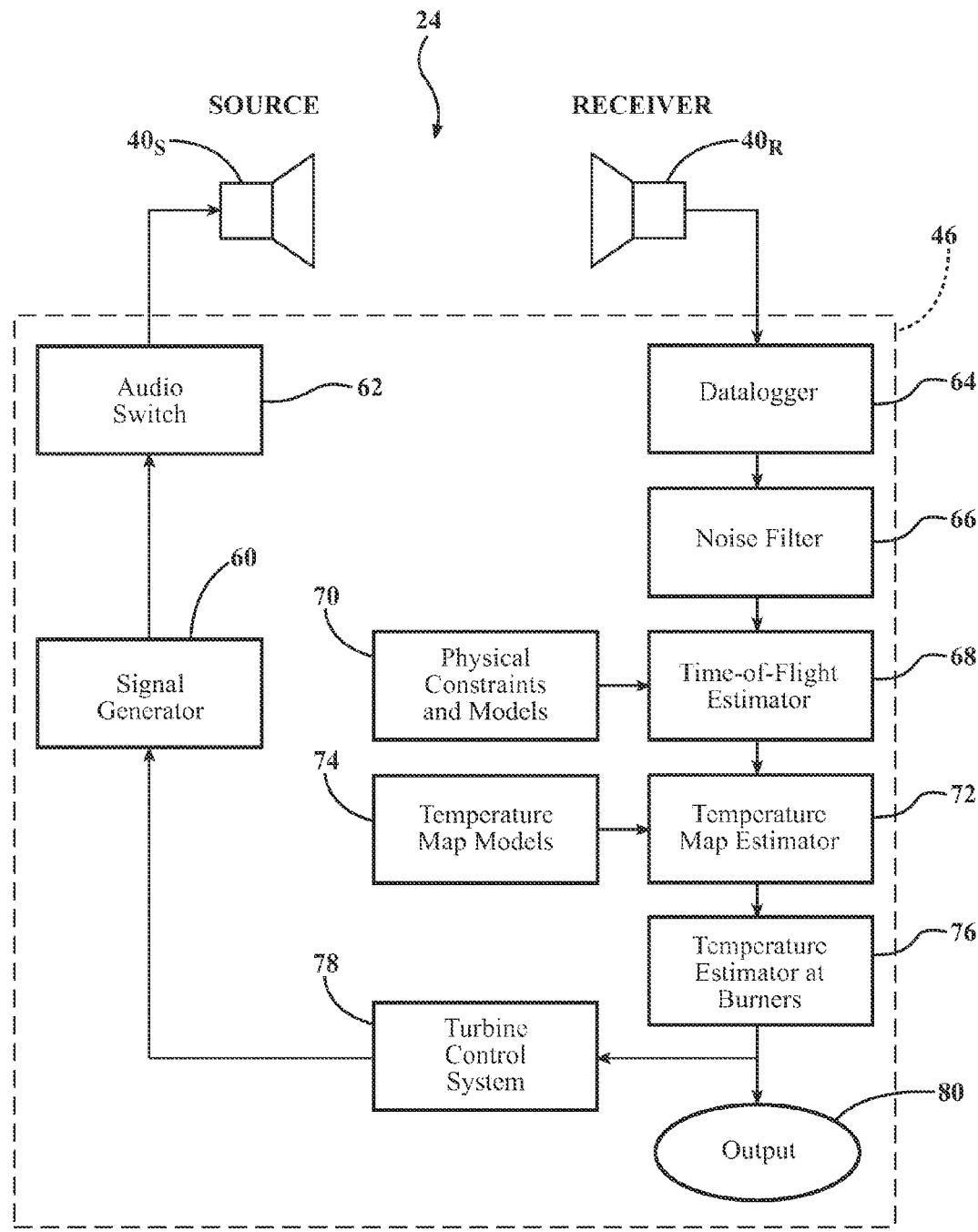
FIG. 4 is a schematic illustrating an apparatus including a controller for providing a temperature determination in accordance with aspects of the invention.

Referring to FIG. 4, the processor or controller 46 for performing signal generation and signal processing is illustrated. The controller 46 may include a signal generator 60 for producing a signal encoded with a distinct signature, as described above with reference to FIG. 3A. The signal generator 60 may operate under control of a turbine control system 78, and preferably produces the signal continuously, and an audio switch 62 controls output of the signal from the signal generator 60 to the speaker in a source transducer unit, designated $40_S$. The audio switch 62 is selectively controlled (on/off) in the controller 46 to pass the signal to the source transducer unit $40_S$. By using the audio switch 62, the signal provided to the source transducer unit $40_S$ will not include distortions of the signal, such as an initial gradual signal ramp up or a gradual ending ramp down, that could occur if the signal output were selectively controlled at the signal generator 60. Rather, a sharp ramp at the beginning and end of the signal, produced by turning the audio switch 62 on and off, further enables formation of a distinct signal. Additionally, the audio switch 62 can be used.

The controller 46 further may include a datalogger 64 for receiving and storing signals that are received at a receiver transducer unit $40_R$ located across the flow path 17 from the source transducer unit $40_S$. The datalogger 64 provides the signals to a noise filter 66 where the received signals are compared to the encoded signals that were sent from the source transducer unit $40_S$. The filtering may be characterized as identifying received signals, such as are illustrated in FIG. 3B, to the signals provided to the source transducer unit $40_S$, as illustrated in FIG. 3A. The received signals have distinct characteristics that include unique groups of frequencies occurring at particular times and in a particular sequence in time, and may additionally include a distinct intensity or amplitude associated with each frequency. Hence, each of these distinct characteristics may be used by the noise filter 66 to filter out or identify the signals received by the receiver transducer unit $40_R$ that correspond to the transmitted encoded signals. Other filtering techniques, such as conventional filtering techniques, could also be employed to additionally filter the received signals from noise.

Although the received signal may exhibit some distortion in frequency and amplitude as a result of passing through the hot working gas in the flow path 17, as seen from a comparison of the signals in FIGS. 3A and 3B, the received frequencies will substantially match the transmitted frequencies, and the amplitudes of the received frequencies will be at or above a predetermined amplitude level for a plurality of the frequencies in the distinct signature received at the receiver transducer unit $40_R$. It may be noted that there will be different attenuations of the amplitudes for the different frequencies, and the attenuations at the different frequencies will typically be constant for a given system setup or environment in which the temperature measurement system 24 is used. In FIGS. 3A and 3B, the different intensities or amplitudes are illustrated by different shade lines on the frequency marks 50 in these figures.

Filtered signals from the noise filter 66 are provided to a time-of-flight estimator 68. The time-of-flight estimator 68 identifies valid time-of-flight data for providing a temperature determination or estimate, and includes input from a physical constraints and models module 70. In particular, the physical constraints and models module 70 ensures that the time-of-flight estimates fit within a predicted or modeled criteria for the estimates. The physical constraints and models module 70 may reference various physical parameters that may have an effect on time-of-flight for the received signals including, for example, the physical locations of the source and receiver transducer units $40_S$, $40_R$, physically achievable temperature ranges including monitoring previously measured temperature maps, the range of possible gas constants/properties, the range of possible in plane flow and the resulting scattering of the time-of-flight, the model for the propagation of the sound, the sensitivity of the source and receiver transducer units $40_S$, $40_R$ and the maximal pressure levels for linear operation, and boundary conditions such as those associated with the temperature of the metal surfaces forming the boundary of the flow path 17.

The time-of-flight determinations or estimates are provided from the time-of-flight estimator 68 to a temperature map estimator 72 which correlates multiple time-of-flight estimates to determine or estimate a two-dimensional temperature map across the flow path 17, based on the plurality of line-of-sound paths illustrated in FIG. 2. The temperature map estimator 72 operates in conjunction with a temperature map models module 74 which provides a set of possible temperature maps, such as previously recorded maps and/or their basis functions. In particular, the temperature map will be a linear combination of the basis functions for modeling the temperatures within the area of flow path 17 at the measurement plane defined by the transducers 40. The temperature maps may be successive modifications of previous temperature maps, where each successive temperature map may comprise a temperature map that exhibits the least deviation from the measured time-of-flight data.

The temperature map estimated at the temperature map estimator 72 is transferred to a temperature estimator at burners module 76 that performs a back calculation to estimate the temperature at an upstream location of a burner 22 for the combustor 16. The estimated burner temperature is provided to the turbine control system 78 for controlling the engine, such as for controlling the fuel/air ratio at the burner 22. Additionally, the temperature may be provided as an output 80, such as may be located at an operator interface, for monitoring the engine.

Figure 5:
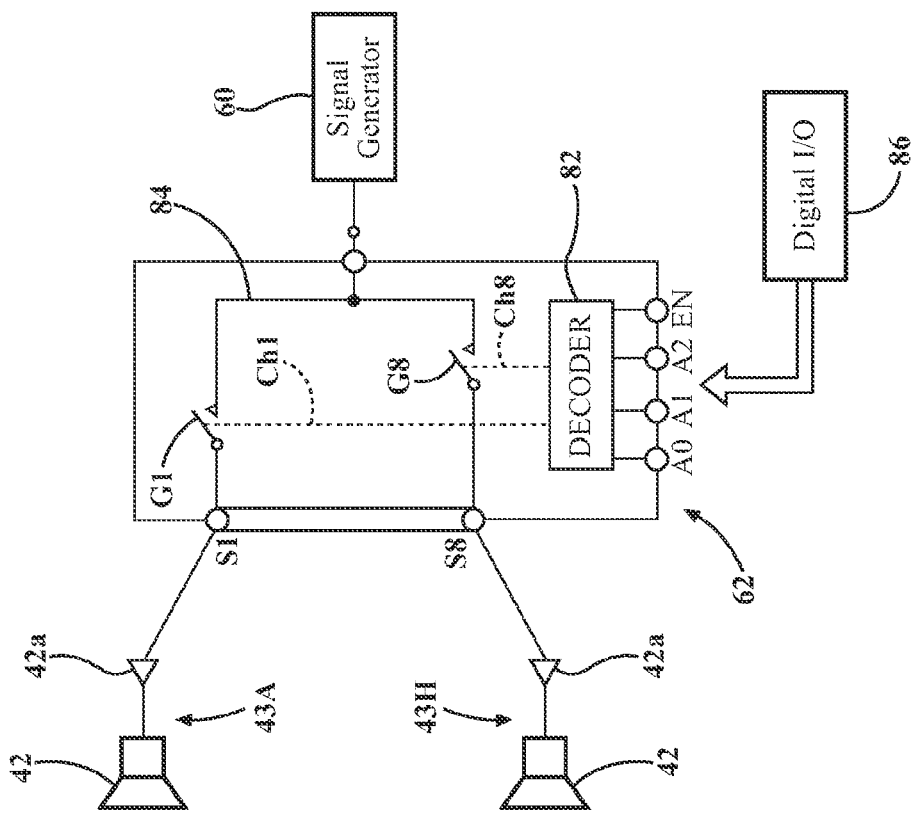
FIG. 5 is a schematic illustrating details of an audio switch in accordance with aspects of the invention.

Referring to FIG. 5, details of an audio switch 62 are illustrated for switching a signal from the signal generator 60 to form sequentially transmitted signals from each of the transducer units 40. In the present illustration, the audio switch 62 is configured to sequentially switch signals to eight transducer units 40A-40H, such as is shown in FIG. 2, where the audio switch 62 connects the signal generator 60 to only one of the transducer units 40A-40H at a time.

The audio switch 62 is diagrammatically depicted as including eight signal gates G1-G8 with associated outputs S1-S8, wherein only the first and eighth gates G1 and G8 are illustrated, it being understood that gates G2-G7 may be provided in the same manner as is illustrated for G1 and G8. Each of the gates G1-G8 may be selectively closed by a signal on a respective channel Ch1-Ch8 from a decoder 82 to connect a signal placed a common bus line 84 from the signal generator 60 to the speaker 42 in a respective one of the transducer units 40A-40H. It may be understood that the signal provided from the audio switch 62 may be amplified at the speakers 42 by an amplifier 42a associated with each of the speakers 42, wherein the speaker 42 and amplifier 42a form a transmission module 43A-43H for a respective transducer unit 40A-40H.

The decoder 82 has first, second and third address bits A0, A1, A2 for selecting channel addresses associated with each of the gates G1-G8, and an enable bit EN for enabling activation of the selected channel Ch1-Ch8. In an operation of the audio switch 62 a digital I/O interface 86 is activated by the turbine control system 78 to select a channel on the address bits A0, A1, A2 and the enable bit is enabled, i.e., switched from an "all off"=0 state to an "enable on"=1 state. For example, if A0=0, A1=0, A2=0, EN=1, then the first channel Ch1 is activated and the signal generator 60 is connected to the transmission module 43A of the first transducer unit 40A; if A0=0, A1=1, A2=0, EN=1, then the third channel Ch3 is activated and the signal generator 60 is connected to the transmission module 43C of the third transducer unit 40C; and if A0=1, A1=1, A2=1, EN=1, then the eighth channel Ch8 is activated and the signal generator 60 is connected to the transmission module 43H of the eighth transducer unit 40H.

The described audio switch 62 may be used to sequentially provide a signal from the signal generator 60, with sharp on and off ramps, to each of the transmission modules 43A-43H. Further, it may be understood that the same encoded signal may be provided from the signal generator 60 to each of the transmission modules 43A-43H.

Figure 6:
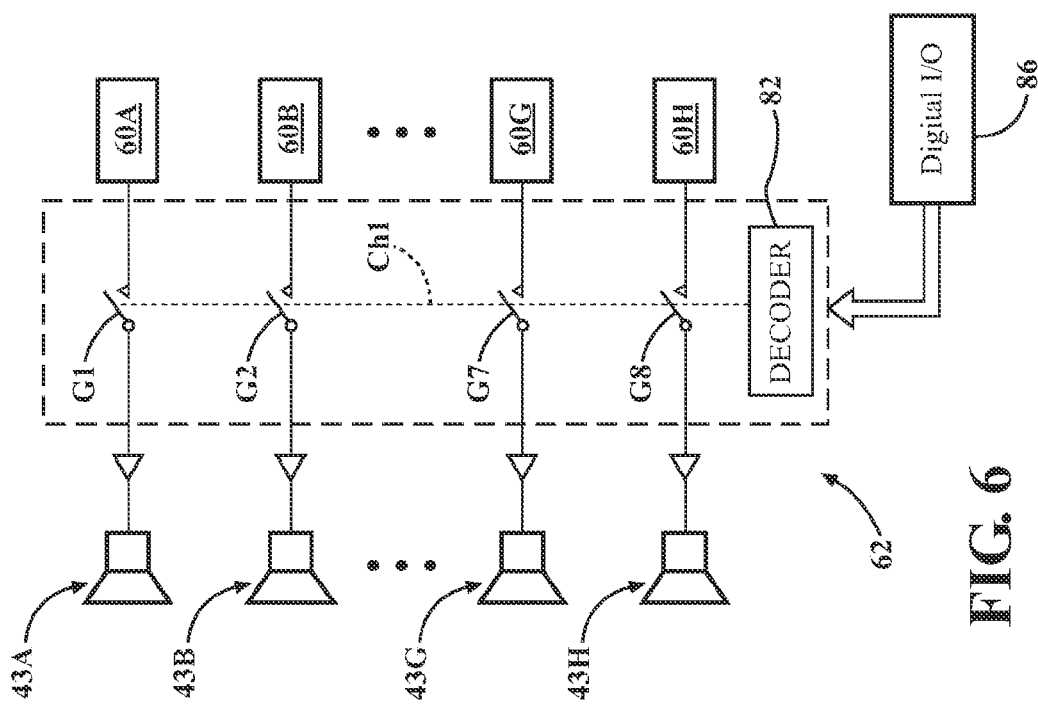
FIG. 6 is a schematic illustrating an alternative configuration for an audio switch in accordance with aspects of the invention.

FIG. 6 illustrates an alternative configuration for transmitting signals via the transmission modules 43A-43H. In this configuration, a separate signal generator 60A-60H may be provided for transmitting a unique encoded signal to each of the transmission modules 43A-43H. The audio switch 62 comprises a plurality of gates G1-G8 that may be actuated simultaneously by a single channel Ch1 activated through a decoder via a digital I/O interface 86 that is activated by the turbine control system 78. Each of the gates G1-G8 connects one of the signal generators 60A-60H to a corresponding one of the transmission modules 43A-43H. Hence, a plurality of encoded signals, e.g., eight unique or distinct encoded signals, may be transmitted simultaneously across the flow path 17 to provide time-of-flight data across all of the transducer units 40 at a single point in time.

Alternatively, the different gates G1-G8 of FIG. 6 may be triggered separately to provide the signals from the different signal generators 60A-60H to the transmission units 43A-43H at different selected times. In this case, the decoder 82 may be activated in a manner similar to that described with reference to FIG. 5, with separate addresses providing activation to corresponding channels for the gates G1-G8.

It may be understood that various aspects of the acoustic signals described above for implementing the invention contribute to signals that have a sparse autocorrelation, and enabling identification of the signals as being distinct from non-signal related acoustic sounds or noise, and that various techniques for performing autocorrelation, as well as cross-correlation between transducer units 40, may be used in identifying a correspondence between transmitted and received signals for obtaining time-of-flight data.

Figure 7:
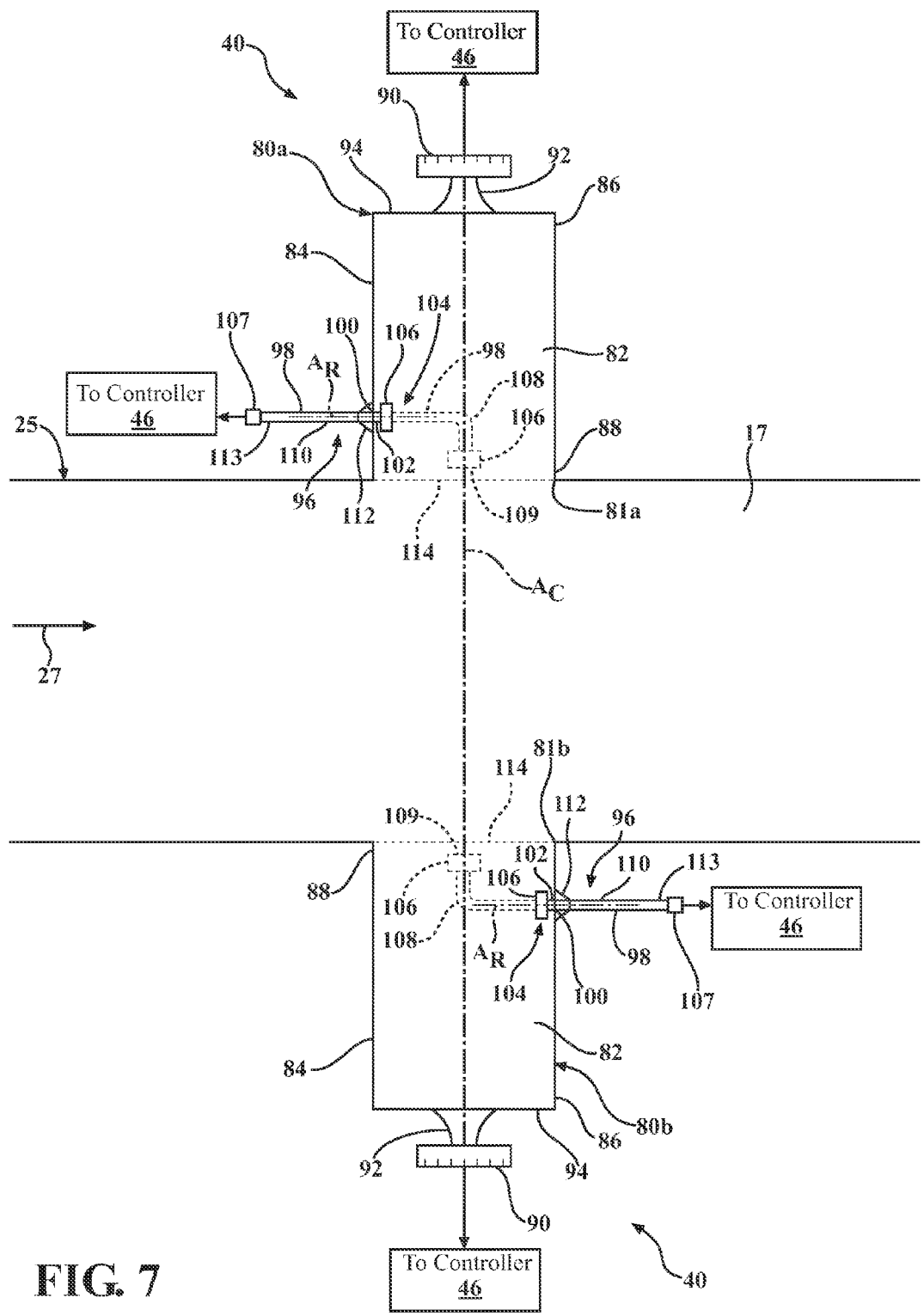
FIG. 7 is a diagrammatic view of a portion of the flow path illustrating a transducer unit configuration in accordance with an aspect of the invention.

FIGS. 7-9 and 9A illustrate specific configurations for the audio transducer units 40. It should be noted that the components of the transducer units 40 can typically be located adjacent to hot gas flows, and that configuration of the transducer unit components positions the components to transmit and receive acoustic signals while providing protection from the hot gas flow. Referring to FIG. 7, the transducer units 40 are preferably provided in pairs, identified in FIG. 7 as first and second transmitter/receiver devices 80a, 80b, and located on diametrically opposite sides of the boundary structure 25. In particular, the boundary structure 25 can be formed with openings 81a, 81b extending from outside the boundary structure 25 to the flow path 17 at diametrically opposite locations and at a predetermined axial location along the flow path 17. The transmitter/receiver devices 80a, 80b are affixed to the boundary structure 25 at the openings 81a, 81b to transmit and receive acoustic signals across the flow path 17.

Each of the transmitter/receiver devices 80a, 80b includes an elongated sound passage 82 formed by a transducer unit body 84 that is defined by a surface of revolution having a first end 86 and an opposing second end 88, the second end 88 being affixed to the boundary structure 25 for transmission of sound signals between the sound passage 82 and the flow path 17. The surface of revolution defined by the transducer unit body 84 is formed about a central axis $A_C$ extending between the first and second ends 86, 88, and the transducer unit body 84 is illustrated as a cylindrical wall. However, it may be understood that the transducer unit body 84 may be configured in other forms, such as a conical shape to form a sound transmission structure such as, for example, a horn. An acoustic sound source 90 is located at the first end 86 of the transducer unit body 84 and may be in acoustic communication with the sound passage 82 via a connecting wave guide 92 extending between the acoustic source 90 and an end wall 94 defining a closed end for the second end 86 of the transducer unit body 84. The connecting wave guide 92 can operate to communicate acoustic signals from the acoustic source 90 while distancing the acoustic source 90 from hot gases passing through the flow path 17.

The acoustic source 90 can comprise a transmission module, as described above with reference to the transmission modules 43A-43H. Alternatively, the acoustic source 90 may comprise a pneumatically powered sound source capable of providing precise frequency outputs at predetermined signal patterns, such as signal patterns described above.

Each transmitter/receiver device 80a, 80b additionally includes an acoustic receiver 96 located within the sound passage 82 between the first and second ends 86, 88. The acoustic receiver 96 includes a support rod 98 extending through a hole 100 in the transducer unit body 84 between the first and second ends 86, 88. The support rod 98 has an inner end 102 located within the sound passage 82 and supporting a receiver end 104 for receiving acoustic signals into the acoustic receiver 96.

In particular, the acoustic receiver 96 includes a microphone 106 located on the inner end 102 of the support rod 98 and defining the receiver end 104. The microphone 106 is preferably a high temperature and high sensitivity microphone, such as piezoelectric or capacitance type microphone. The support rod 98 is preferably a hollow tube for accommodating passage of one or more wires (not shown) extending from the microphone 106 and providing acoustic signals to a preamplifier 107 at an outer end 113 of the support rod 98 located outside of the sound passage 82. The preamplifier 107 is located outside of the sound passage 82 to distance the preamplifier 107 from the high temperature gas flowing through the flow path 17 and in communication with the sound path 82. The microphone 106 can be located on the transducer unit body 84 close to the flow path 17, and is illustrated positioned close to an inner surface of the transducer unit body 84 and near the intersection of the second end 88 of the transducer unit body 84 with the boundary structure 25.

An alternative position of the microphone 106, as illustrated in dotted lines, is configured to position the microphone 106 at the central axis $A_C$ of the transducer unit body 84 and close to the opening 81a, 81b defined in the boundary structure 25. Various alternate positions of the microphone 106 may be accomplished by forming the support rod 98 of a malleable material that can be bent at a transition portion 108 to position a sound receiving opening 109 of the microphone 106 facing away from the acoustic source 90 associated with the respective transducer unit body 84 and toward the opening 81a, 81b. A central portion 110 of the support rod 98 defines a rod axis $A_R$ transverse, e.g., perpendicular, to the central axis $A_C$. The central portion 110 can be supported to the transducer unit body 84 by a compression ferrule fitting 112, where the fitting 112 may be loosened to permit movement of the central portion 110 through the hole 100 toward and away from the central axis $A_C$. The fitting 112 is tightened to maintain the central portion 110 at a selected position for maintaining the microphone 106 in a fixed predetermined location within the sound passage 82. By feeding additional length of the central portion 110 into the sound passage 82 and forming the bent transition portion 108 at the central axis $A_C$, the microphone 106 can be positioned closer to the opening 81a, 81b of the structural boundary 25. Further, a fine wire mesh 114 can be located on the boundary structure 25, covering the opening 81a, 81b to isolate the microphone 106 from blowing or noise created by movement of the hot gases passing through flow path 17 close to the microphone 106.

Figure 8:
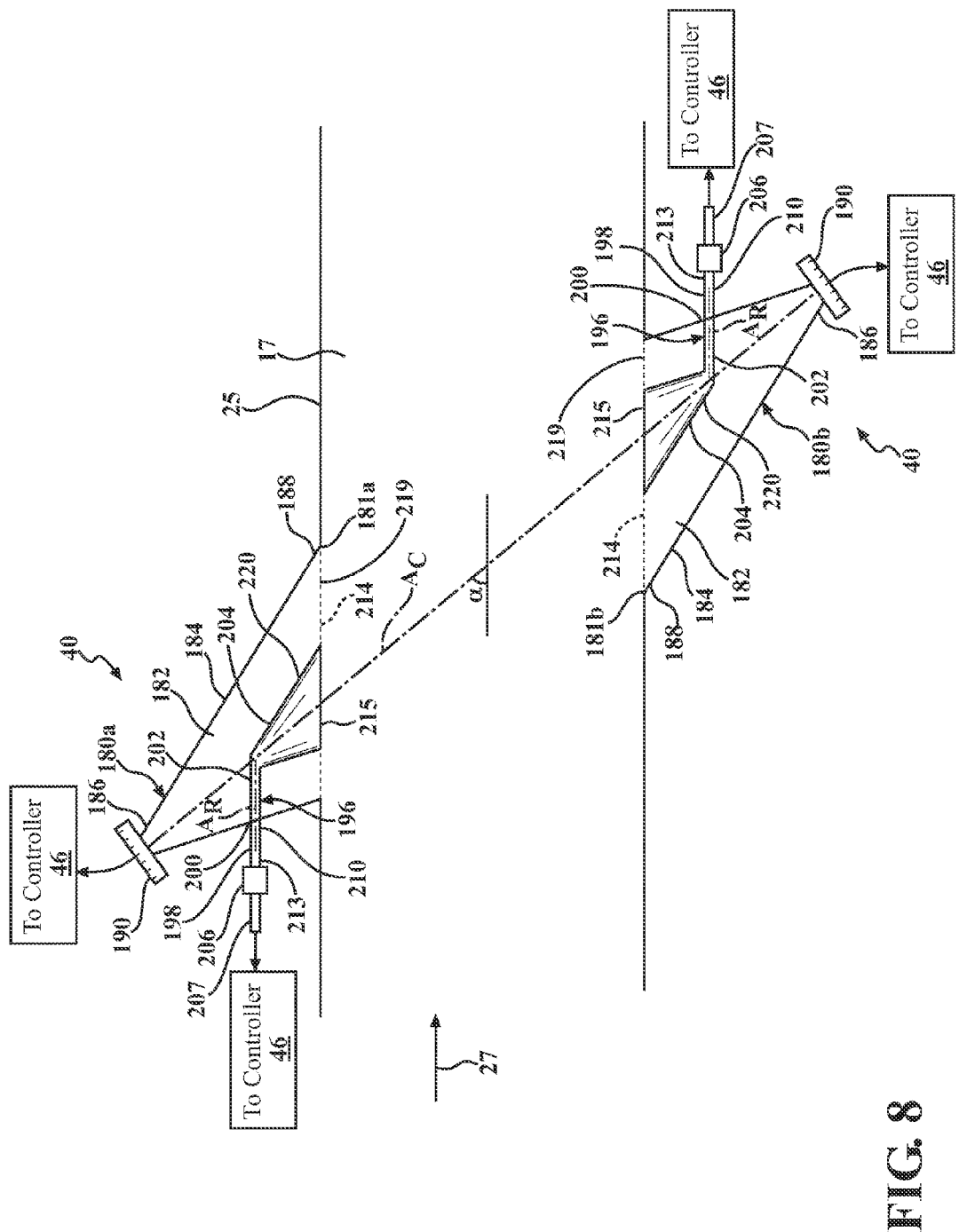
FIG. 8 is a diagrammatic view of a portion of the flow path illustrating another transducer unit configuration in accordance with an aspect of the invention.

Referring to FIG. 8, a further configuration of the transducer units 40 is illustrated in which elements corresponding to elements described with reference to FIG. 7 are labeled with the same reference numeral increased by 100. The transducer units 40 are illustrated in FIG. 8 as first and second transmitter/receiver devices 180a, 180b, and located on diametrically opposite sides of the boundary structure 25. In particular, the boundary structure 25 can be formed with openings 181a, 181b extending from outside the boundary structure 25 to the flow path 17 at diametrically opposite locations and at a predetermined axial location, or locations along the flow path 17. The transmitter/receiver devices 180a, 180b are affixed to the boundary structure 25 at the openings 181a, 181b to transmit and receive acoustic signals across the flow path 17.

Each of the transmitter/receiver devices 180a, 180b includes an elongated sound passage 182 formed by a transducer unit body 184 that is defined by a surface of revolution and having a first end 186 and an opposing second end 188, the second end 188 being affixed to the boundary structure 25 for transmission of sound signals between the sound passage 182 and the flow path 17. The surface of revolution defined by the transducer unit body 184 is formed about a central axis $A_C$ extending between the first and second ends 186, 188, and the transducer unit body 184 is illustrated as a horn defined by an outwardly tapered wall, i.e., tapered outwardly from the first end 186 to the second end 188, for transmitting acoustic signals from the sound passage 182 toward the flow path 17. An acoustic sound source 190 is located at the first end 186 of the transducer unit body 184.

The acoustic source 190 can comprise a transmission module, as described above with reference to the transmission modules 43A-43H. Alternatively, the acoustic source 190 may comprise a pneumatically powered sound source capable of providing precise frequency outputs at predetermined signal patterns, such as signal patterns described above.

Each transmitter/receiver device 180a, 180b additionally includes an acoustic receiver 196 located within the sound passage 182 between the first and second ends 186, 188. The acoustic receiver 196 includes a support rod 198 extending through a hole 200 in the transducer unit body 184 between the first and second ends 186, 188. The support rod 198 has an inner end 202 located within the sound passage 182 and supporting a receiver end 204 for receiving acoustic signals into the acoustic receiver 196.

In particular, the receiver end 204 is formed as a horn defined by an outwardly tapered wall 220 extending from the inner end 202 of the support rod 198 to an open end 215 of the receiver horn located at the opening 181a, 181b for receiving acoustic signals from the flow path 17 into the acoustic receiver 196. A fine wire mesh 214 can be located on the boundary structure 25, covering the opening 181a, 181b to limit blowing or noise created by movement of the hot gases passing through flow path 17 at the entrance to the receiver end 204.

The horn defined by the tapered wall 220 is surrounded by the horn defined by the transducer unit body 184. The open end 215 of the tapered wall 220 has a circumference that is located spaced from the second end 188 of the transducer unit body 184 to define an annular acoustic transmission passage 219 for passage of acoustic signals from the acoustic source 190 to the flow passage 17.

The support rod 198 is formed with a hollow central portion 210 to define a waveguide comprising an acoustically continuous passage with the tapered wall 220. The acoustic receiver 196 further includes a microphone 206 at an outer end 213 of the support rod 198 outside of the sound passage 182. The microphone 206 receives acoustic signals from the waveguide formed by the central portion 210 to produce a corresponding electrical signal conveyed to a preamplifier 207 that can be located adjacent to the microphone 206 at the outer end 213 of the support rod 198. Locating the microphone 206 outside of the sound passage 182 positions the microphone 206 in spaced relation from the hot gas flow and can permit use of a lower temperature microphone as compared to the configuration of FIG. 7.

In accordance with an aspect of the configuration of FIG. 8, the transmitter/receiver devices 180a, 180b can be located on the boundary structure 25 such that the second transmitter/receiver device 180b is located downstream from the first transmitter/receiver device 180a relative to the axial gas flow direction 27 in the flow path 17. Further, the central axes $A_C$ of both the transmitter/receiver devices 180a, 180b can be oriented at a non-perpendicular angle α relative to the axial gas flow direction 27, and the transmitter/receiver devices 180a, 180b can be aligned along a common axis $A_C$. That is, the central axes $A_C$ of the transmitter/receiver devices 180a, 180b are oriented at an angle α between 90 degrees and 180 degrees relative to the axial gas flow direction 27. The gas flow in the flow path 17 can cause an axial displacement of the sound signals traveling across the flow path 17, and positioning the transmitter/receiver device 180b axially displaced downstream locates the transmitter/receiver device 180b to efficiently receive signals transmitted from the upstream transmitter/receiver device 180a being operated to transmit sound signals. In a typical arrangement, three to four pairs of the transmitter/receiver devices 180a, 180b may be arranged circumferentially around the boundary structure 25.

Additionally, it may be noted that the first and second transmitter/receiver devices 80a, 80b described with reference to FIG. 7 may be positioned angled relative to the axial gas flow direction 27 and at axially displaced locations similar to that described with reference to the axial locations of the first and second transmitter/receiver devices 180a, 180b of FIG. 8.

Figure 9:
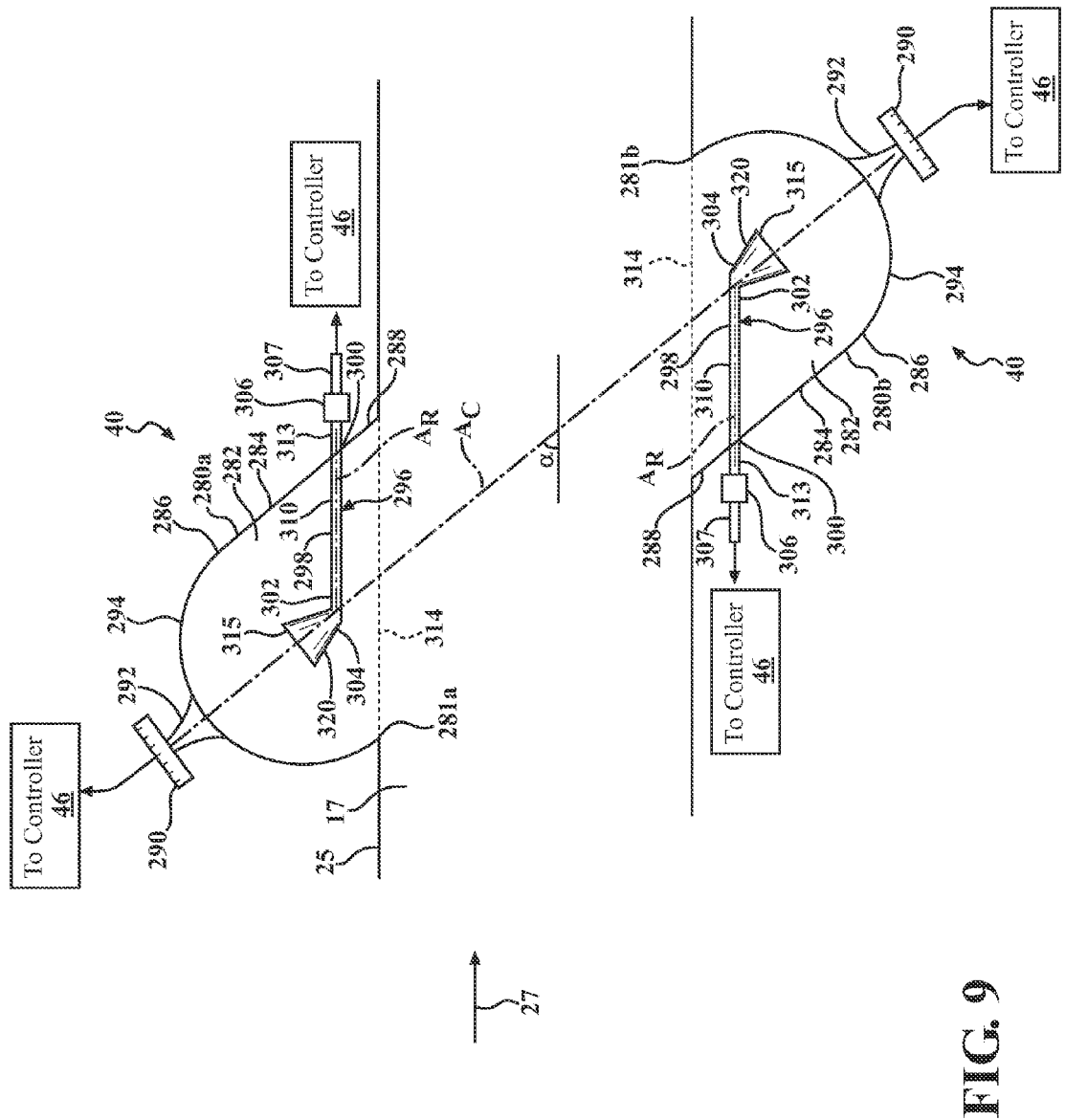
FIG. 9 is a diagrammatic view of a portion of the flow path illustrating a further transducer unit configuration in accordance with an aspect of the invention.

Referring to FIG. 9, a further configuration of the transducer units 40 is illustrated in which elements corresponding to elements described with reference to FIG. 8 are labeled with the same reference numeral increased by 100. The transducer units 40 are illustrated in FIG. 8 as first and second transmitter/receiver devices 280a, 280b, and located on diametrically opposite sides of the boundary structure 25. In particular, the boundary structure 25 can be formed with openings 281a, 281b extending from outside the boundary structure 25 to the flow path 17 at diametrically opposite locations and at a predetermined axial location, or locations along the flow path 17. The transmitter/receiver devices 280a, 280b are affixed to the boundary structure 25 at the openings 281a, 281b to transmit and receive acoustic signals across the flow path 17.

Each of the transmitter/receiver devices 280a, 280b includes an elongated sound passage 282 formed by a transducer unit body 284 that is defined by a surface of revolution and having a first end 286 and an opposing second end 288, the second end 288 being affixed to the boundary structure 25 for transmission of sound signals between the sound passage 282 and the flow path 17. The surface of revolution defined by the transducer unit body 284 is formed about a central axis $A_C$ extending between the first and second ends 286, 288, and the transducer unit body 284 is illustrated as a horn defined by a cylindrical wall, and a parabolic dish surface is defined by an end wall 294. As can be seen, at least a portion of the end wall 294 can extend to the boundary surface 25 due to an angular orientation of the transmitter/receiver devices 280a, 280b. An acoustic sound source 290 is located at the first end 286 of the transducer unit body 284, and may be in acoustic communication with the sound passage 282 via a connecting wave guide 292 in the form of a short horn extending between the acoustic source 290 and the end wall 294.

The acoustic source 290 can comprise a transmission module, as described above with reference to the transmission modules 43A-43H. Alternatively, the acoustic source 290 may comprise a pneumatically powered sound source capable of providing precise frequency outputs at predetermined signal patterns, such as signal patterns described above.

Each transmitter/receiver device 280a, 280b additionally includes an acoustic receiver 296 located within the sound passage 282 between the first and second ends 286, 288. The acoustic receiver 296 includes a support rod 298 extending through a hole 300 in the transducer unit body 284 between the first and second ends 286, 288. The support rod 298 has an inner end 302 located within the sound passage 282 and supporting a receiver end 304 for receiving acoustic signals into the acoustic receiver 296.

In particular, the receiver end 304 is formed as a horn defined by an outwardly tapered wall 320 extending from the inner end 302 of the support rod 298 to an open end 315 of the receiver horn located facing toward the end wall 294. In accordance with an aspect of the present configuration, sound signals received at the transmitter/receiver device 280a, 280b reflect off of the parabolic dish surface defined by the end wall 294. In particular, the parabolic dish surface can operate to reflect sound signals entering the sound passage 282 along different angles and direct the signals toward the open end 315 of the receiver horn. Further, the orientation of the open end 315 of the receiver horn toward the acoustic source 290 can facilitate use of the acoustic receiver 296 to detect the start of a sound signal from a respective acoustic source 290 in order to provide an accurate point in time to initiate the time-of-flight measurement. A fine wire mesh 314 can be located on the boundary structure 25, covering the opening 281a, 281b to limit blowing or noise created in the sound passage 282 by movement of the hot gases passing through flow path 17 at the opening 281a, 281b.

The support rod 298 is formed with a hollow central portion 310 to define a waveguide comprising an acoustically continuous passage with the tapered wall 320. The acoustic receiver 296 further includes a microphone 306 at an outer end 313 of the support rod 298 outside of the sound passage 282. The microphone 306 receives acoustic signals from the waveguide formed by the central portion 310 to produce a corresponding electrical signal conveyed to a preamplifier 307 that can be located adjacent to the microphone 306 at the outer end 313 of the support rod 298. Locating the microphone 306 outside of the sound passage 282 positions the microphone 306 in spaced relation from the hot gas flow and can permit use of a lower temperature microphone as compared to the configuration of FIG. 7.

As described above with reference to FIG. 8, the transmitter/receiver devices 280a, 280b of the present configuration can be located on the boundary structure 25 such that the second transmitter/receiver device 280b is located downstream from the first transmitter/receiver device 280a relative to the axial gas flow direction 27 in the flow path 17. Further, the central axes $A_C$ of both the transmitter/receiver devices 280a, 280b can be oriented at an angle α relative to the axial gas flow direction 27, and the transmitter/receiver devices 280a, 280b can be aligned along a common axis $A_C$. That is, the central axes $A_C$ of the transmitter/receiver devices 280a, 280b are oriented at an angle α between 90 degrees and 180 degrees relative to the axial gas flow direction 27.

Figure 9A:
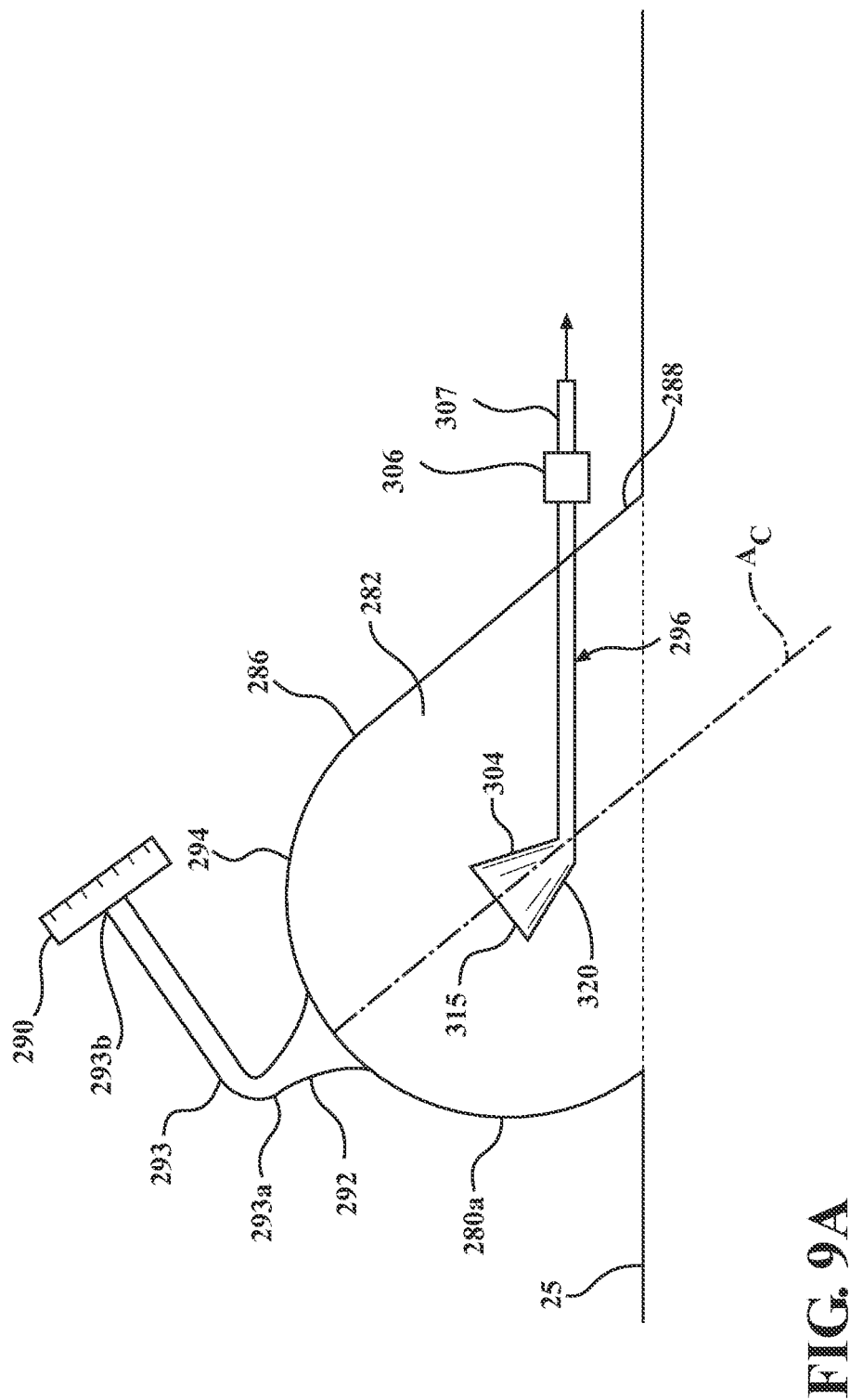
FIG. 9A is a diagrammatic view illustrating a variation of the transducer unit configuration shown in FIG. 9.

FIG. 9A illustrates a variation on the configuration of FIG. 9 and is shown as modification of the transmitter/receiver device 280a. In particular, the acoustic source 290 of the transmitter/receiver device 280a is shown connected to the end wall 294 via the connecting wave guide 292 and a cylindrical waveguide 293 having a proximal end 293a adjacent to the parabolic dish surface and a distal end 293b adjacent to the acoustic source 290. The waveguide 293 provides an extended acoustic path between the acoustic source 290 and the sound passage 282. The extended acoustic path provided by the waveguide 293 enables positioning the acoustic source 290 in spaced relation to the parabolic dish surface further from the hot gases passing through the flow path 17, providing protection of the acoustic source 290 from damage that may result from exposure to elevated temperatures.

It may be understood that, although the above description is presented with reference to providing a temperature determination within a combustor section 14 of the engine, the principles of operation described herein may be implemented in any region of the engine where it is desirable to obtain the temperature of a gas.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A gas turbine engine including an apparatus for controlling operation of the gas turbine engine, and the engine having a boundary structure defining a flow path passing through the engine, the apparatus for controlling operation of the engine comprising:
  at least one acoustic transmitter/receiver device located on the boundary structure at a predetermined axial location along the flow path, the acoustic transmitter/receiver device including:
    an elongated sound passage defined by a surface of revolution having opposing first and second ends and a central axis extending between the first and second ends;
    an acoustic sound source located at the first end; and
    an acoustic receiver located within the sound passage between the first and second ends;
  the boundary structure including an opening extending from outside the boundary structure to the flow path; and
  the second end of the surface of revolution is affixed to the boundary structure at the opening for passage of acoustic signals between the sound passage and the flow path.

2. The gas turbine engine of claim 1, wherein the acoustic receiver includes a support rod extending through a hole in the surface of revolution between the first and second ends, the support rod having an inner end located within the sound passage and supporting a receiver end for receiving acoustic signals into the acoustic receiver.

3. The gas turbine engine of claim 2, wherein the acoustic receiver includes a microphone located on the inner end of the support rod and defining the receiver end.

4. The gas turbine engine of claim 3, wherein the support rod is detachably affixed to the surface of revolution, and is supported for movement of the inner end toward and away from the central axis of the surface of revolution.

5. The gas turbine engine of claim 3, wherein the support rod includes a central portion defining a rod axis extending through the hole in the surface of revolution and transverse to the central axis, and the support rod includes a transition portion that is bent to position a sound receiving opening of the microphone facing away from the acoustic source and toward the flow path.

6. The gas turbine engine of claim 3, wherein the microphone is located at the central axis of the surface of revolution.

7. The gas turbine engine of claim 3, including a preamplifier receiving acoustic signals from the microphone and located at an outer end of the support rod outside of the sound passage.

8. The gas turbine engine of claim 2, wherein the receiver end at the inner end of the support rod is formed as a horn defined by an outwardly tapered wall, extending from the inner end of the support rod, for receiving acoustic signals into the acoustic receiver.

9. The gas turbine engine of claim 8, wherein the support rod includes a hollow central portion defining a waveguide extending through the hole in the surface of revolution, and the acoustic receiver including a microphone at an outer end of the support rod outside of the sound passage.

10. The gas turbine engine of claim 8, wherein the surface of revolution is tapered outwardly from the acoustic source to the boundary structure and defines a horn surrounding the horn of the receiver end.

11. The gas turbine engine of claim 10, wherein the horn of the receiver end includes an open end located at the opening of the boundary structure, and an annular acoustic transmission passage is defined between the surface of revolution and the horn of the receiver at the boundary structure.

12. The gas turbine engine of claim 8, wherein the first end of the surface of revolution defines a parabolic dish surface facing toward the horn of the receiver end, and the horn of the receiver end includes an open end facing toward the parabolic dish surface.

13. The gas turbine engine of claim 12, wherein the acoustic sound source is spaced from the parabolic dish surface by an elongated waveguide having a proximal outlet opening adjacent to the parabolic dish surface and a distal inlet opening adjacent to the acoustic sound source.

14. The gas turbine engine of claim 1, wherein the central axis of the acoustic transmitter/receiver device is oriented at an angle between 90 degrees and 180 degrees relative to an axial flow direction of gases in the flow path to project acoustic signals in a downstream direction from the opening in the boundary structure.

15. The gas turbine engine of claim 14, wherein the at least one acoustic transmitter/receiver device defines a first acoustic transmitter/receiver device, and including a second acoustic transmitter/receiver device located on the boundary structure at a predetermined axial position in a downstream direction from the first acoustic transmitter/receiver device relative to a gas flow direction in the flow path, the second transmitter/receiver device receiving acoustic sound signals transmitted from the first acoustic transmitter/receiver device.

16. A gas turbine engine including an apparatus for controlling operation of the gas turbine engine, and the engine having a boundary structure defining a flow path passing through the engine, the apparatus for controlling operation of the engine comprising:
first and second acoustic transmitter/receiver devices located on the boundary structure at predetermined axial locations along the flow path, the acoustic transmitter/receiver devices each including:
an elongated sound passage defined by a surface of revolution having opposing first and second ends and a central axis extending between the first and second ends;
an acoustic sound source located at the first end; and
an acoustic receiver located within the sound passage between the first and second ends, the acoustic receiver including a support rod extending through a hole in the surface of revolution between the first and second ends, the support rod having an inner end located within the sound passage and supporting a receiver end for receiving acoustic signals into the acoustic receiver;
the boundary structure including first and second openings extending from outside the boundary structure to the flow path; and
the second end of each surface of revolution is affixed to the boundary structure at a respective one of the openings for passage of acoustic signals between the sound passage and the flow path.

17. The gas turbine engine of claim 16, wherein the central axes of the surface of revolution for the first and second acoustic transmitter/receiver devices are located on a common line passing through the flow path and oriented at a non-perpendicular direction relative to the flow path direction.

18. A gas turbine engine including an apparatus for controlling operation of the gas turbine engine, and the engine having a boundary structure defining a flow path passing through the engine, the apparatus for controlling operation of the engine comprising:
first and second acoustic transmitter/receiver devices located on the boundary structure at predetermined axial locations along the flow path, the acoustic transmitter/receiver devices each including:
an elongated sound passage defined by a surface of revolution having opposing first and second ends and a central axis extending between the first and second ends;
an acoustic sound source located at the first end; and
an acoustic receiver located within the sound passage between the first and second ends;
the boundary structure including first and second openings extending from outside the boundary structure to the flow path;
the second end of each surface of revolution is affixed to the boundary structure at a respective one of the openings for passage of acoustic signals between the sound passage and the flow path;
a signal generator producing at least one signal having a distinct signature defined by a set of predetermined frequencies forming a non-broadband signal that is output as an acoustic sound signal at the acoustic sound source;

a signal processor configured to compare signals received at the second acoustic transmitter/receiver device to one or more transmitted signals to identify a similarity of a received signal to a transmitted signal to identify a transmission time for the received signal, and the processor configured to determine a time-of-flight for the received signal and to process the time-of-flight to determine a temperature in a region of the predetermined axial location.

19. The gas turbine engine of claim 18, wherein the acoustic receiver of the first acoustic transmitter/receiver device includes a microphone connected to the signal processor and providing a signal corresponding to initiation of the transmitted signal as the transmitted signal passes the acoustic receiver of the first acoustic transmitter/receiver device.

* * * * *